Dec. 18, 1962 W. T. HIGGINS 3,068,532
METHOD OF PREPARING INSULATED ELECTRICAL CONDUCTORS
Filed Dec. 9, 1958
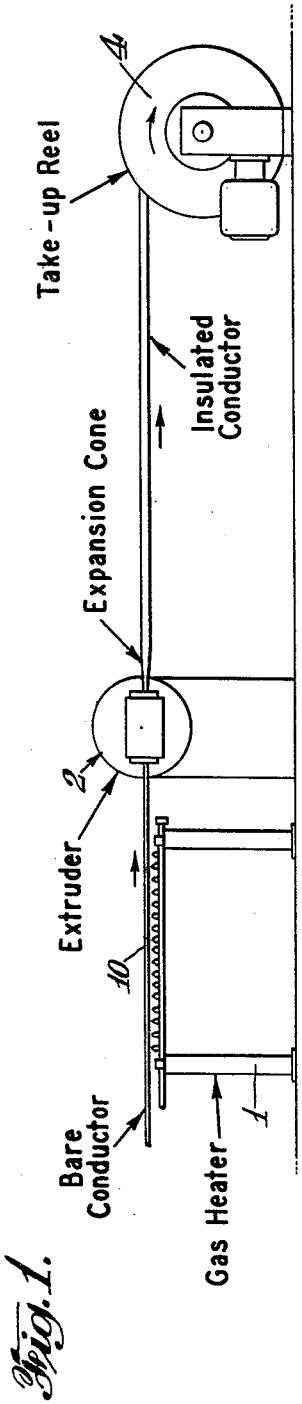
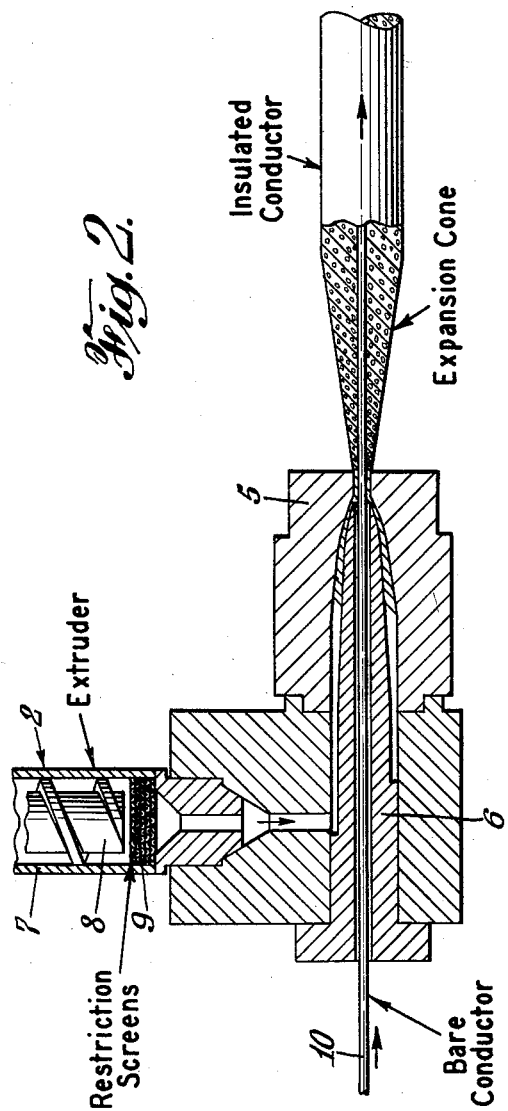
INVENTOR
WILLIAM T. HIGGINS
BY
*James C. Arantes*
ATTORNEY

United States Patent Office 3,068,532
Patented Dec. 18, 1962

3,068,532
METHOD OF PREPARING INSULATED
ELECTRICAL CONDUCTORS
William T. Higgins, Roselle, N.J., assignor to Union
Carbide Corporation, a corporation of New York
Filed Dec. 9, 1958, Ser. No. 779,186
12 Claims. (Cl. 18—59)

This invention relates to insulated electrical conductors comprising an electrical conductor and insulation thereon comprising expanded or blown polyethylene. The invention also relates to a method for the extrusion of expanded or blown polyethylene directly about and onto an electrical conductor.

It is well-known that solid polyethylene possesses numerous electrical properties which make it ideally suitable for use as an electrical insulating material. I have found that expanded or blown polyethylene, characterized by a closed or discontinuous cell structure, possesses certain electrical and physical properties which are markedly superior to those corresponding properties of solid polyethylene and which make it more advantageous to employ, in particular applications, as an insulating material. The outstanding advantages which such cellular polyethylene exhibits over solid polyethylene as an insulating material are a lower dielectric constant and a lower density. In addition to such improved properties, I have found that other desirable properties of solid polyethylene, including a low-power factor, impermeability to moisture, and high insulation resistance are also found in blown or cellular polyethylene.

Heretofore, as blown or expanded polyethylene-insulated conductors were unknown, no method existed for their preparation. I have found that such insulated conductors may be readily and continuously prepared by employing an extrusion process. Broadly, my method comprises continuously charging a composition comprising polyethylene resin and a blowing agent to the feed or rear end of the cylinder of a screw extruder, working and feeding the composition along the cylinder while heating the cylinder to a temperature sufficient to cause the blowing agent to decompose, restricting the flow of the composition at the discharge end of the cylinder to cause and maintain considerable back-pressure in the cylinder and thereby substantially prevent the gas formed by the decomposition of the blowing agent from expanding within the composition. The composition, as it is forced from the cylinder, is directed to and through a forming section comprising a die and a hollow guider pin. A conductor is passed through the passage in the guider pin and the composition is applied about such conductor. In the continuous process, the composition containing the gas from the decomposed blowing agent will not substantially expand during passage through the forming section. However, once the composition is applied about the conductor and has passed out of the forming section, i.e. out of the die, the compressed gases therein are free to expand, and do so as the conductor and the applied composition are directed from the die to take-up rolls.

A particularly advantageous feature of my method is that expansion of the occluded gases occurs in such a manner as to produce a uniform thickness of expanded or blown polyethylene about the conductor. In addition, my method results in the preparation of such insulation which is characterized by a cellular structure comprised of single cells, encompassed by a substantially solid continuous skin of polyethylene.

In the practice of my invention, I obtain a dispersion of the blowing agent in polyethylene by charging the ingredients to a Banbury mixer and mixing at a temperature above the fluxing point of polyethylene but below the decomposition point of the blowing agent. Thorough dispersion of the blowing agent in the composition is necessary and care must be taken to maintain the temperature of the composition, when in the mixer, at least 5° C. below the decomposition temperature of the agent. As the blowing agent, we may employ any of the well-known compounds which decompose above the fluxing temperature of polyethylene. We prefer to employ such compounds which decompose at temperatures of from about 130° C. to about 180° C. Particularly suitable for use is Celogen, p,p'-oxybis(benzene sulfonyl hydrazide), which is manufactured and sold by the United States Rubber Company.

Celogen decomposes and commences to evolve gas at a temperature of about 130° C. As the fluxing temperature of polyethylene is about 110° C., the blowing agent may be dispersed in a Banbury mixer operation at a temperature of from about 110° C. to about 125° C. After a thorough dispersion is obtained, the composition may then be milled and fed directly to an extruder or, if desired, it may be dropped and sheeted on a 2-roll mill and diced. By following the latter procedure, the composition may be prepared at one location and shipped for application to electrical conductors at another location.

Various amounts of a blowing agent may be employed depending upon the density of the cellular structure desired. Normally, the blowing agent will be employed in an amount of from about 0.1% to about 10% by weight of the total composition. However, when using Celogen as the blowing agent, I prefer to employ it in an amount of about 1% by weight of the total composition. A composition containing such an amount of Celogen will, when applied, provide a markedly superior insulating material as an excellent compromise is obtained between the retention of the physical properties of solid polyethylene and the desirable reduction in dielectric constant gained by the cellular structure.

The extent to which the polyethylene composition will expand upon application to a conductor is governed by the amount of blowing agent employed and whether or not the temperature of the composition is sufficiently high to obtain complete utilization of the blowing agent. I have found that the temperature of the polyethylene composition should be at 170° C. or above to insure complete decomposition of Celogen. If temperatures below 170° C. are employed, the expansion of polyethylene may not be complete and erratic results in the density of the composition may occur. When employing the preferred composition which contains about 1% by weight of the total composition of Celogen, in the extrusion of such material about a conductor at a temperature of at least 170° C., the expansion of polyethylene obtained will be approximately 100%. The final diameter of the insulated conductor may then be computed by the following empirical formula:

$$D = \sqrt{2Di^2 - d^2}$$

where:

$D$ = Final outer diameter of insulated conductor
$Di$ = Die diameter
$d$ = Conductor diameter Conversely using the same formula, the approximate die size may be obtained if the desired final outer diameter and the conductor size are known.

In the practice of my invention I have found it necessary to preheat the conductor before applying the insulation. If a conductor at room temperature is employed, the outer surface of the insulation, after application, is quite lumpy as the composition appears to alternately grab and buckle thereon. Normally, I preheat the conductor by passing it over a burner or the like to a temperature of at least 100° C.

Another important feature of the method of the invention is the cooling of the extruded blown product after application to the conductor. When the product passes from the die, it is extremely weak, and should it be too rapidly cooled, there results a contraction of the occluded gases before the polyethylene has sufficient strength to resist collapse. Thus, the insulation becomes flat and deformed.

To overcome this source of injury to the insulation, I provide for the air cooling of the polyethylene. The extent to which the insulated conductor is air-cooled depends upon the thickness of the insulation and the extent of the wire preheat.

The application of the insulation to electric conductors is conducted at speeds normally obtained in the application of solid polyethylene to such conductors. These speeds will depend upon the size of the conductor employed and upon the output of the particular extruder. Thus, for example, I may apply insulation to a small size conductor at a speed of about 1000 feet per minute. Larger size conductors will be coated at lower speeds.

The invention may be further illustrated by reference to the drawings. FIG. 1 represents a view, in side elevation, of suitable apparatus which may be employed to prepare the blown polyethylene insulated conductors. Briefly, the apparatus consists of a gas heater 1, an extruder 2, a die 5, and a take up reel 4. FIG. 2 represents a cross sectional view of a portion of the extruder 2 and the die 5. As may be seen from FIG. 2, the forming section comprises die 5 and guider pin 6. In the practice of my invention a polyethylene composition containing a blowing agent is charged to the feed end of the extruder (not shown) and is worked and fed along the extruder cylinder 7 by means of an extruder screw 8. Generally the extruder cylinder is maintained at a temperature sufficient to cause decomposition of the blowing agent. A series of packed screens 9 are provided at the forward end thereof to restrict the flow of the composition at the discharge end of the cylinder. Consequently, a back pressure is developed within the cylinder which substantially prevents the gas formed by the decomposition of the blowing agent from expanding within the composition.

The composition after passage through the extruder cylinder is directed to the forming section comprising the die 5 and the guider pin 6 and passes therein about a preheated electrical conductor traveling through the guider pin. The compressed gas within the composition does not expand while said composition passes through the forming section. Preheating of the electrical conductor to a temperature of about 100° C. is accomplished by passing the conductor over a gas heater 1 before directing it through the guider pin. Expansion of the compressed gas within the composition occurs once the composition passes from the forming section.

The gas expands within the composition, causing the blown polyethylene structure with its solid continuous skin, while the composition adheres to and travels with the electrical conductor. This expansion occurs naturally and results in the insulation appearing, as shown in FIG. 2, as a cone extending from the end of the forming section or die 5 to the point where expansion is complete. The insulated conductor is then slowly cooled by subjecting it to room temperatures during its passage to take-up reel 4.

The following examples will more fully illustrate my method for preparing blown or expanded polyethylene-insulated conductors.

EXAMPLE 1

There was charged twenty-five pounds of a composition comprising 99% by weight of polyethylene and 1% by weight of Celogen to a Banbury mixer and the ingredients were thoroughly admixed at a temperature of 120° C. The mixture was then dropped, sheeted on a two-roll mill, and diced.

The diced composition was charged to the cylinder of a screw extruder wherein it was thoroughly worked and fed therealong by means of a screw. The cylinder was heated to a temperature of about 190° C. to cause the dispersed Celogen particles to decompose. At the discharge end of the cylinder, a series of 20/40/100/100 mesh screens, arranged in order of increasing density, were so positioned as to restrict the flow of the composition and cause a high-back pressure to be exerted thereagainst. The pressure exerted on the composition by the screw and the back-pressure exerted by the screen-pack is such as to substantially prevent the gas resulting from the decomposition of the Celogen particles from expanding. As a composition passes through the screen-pack it is led to a forming section comprising a die and hollow guider pin. A No. 20 A.W.G. copper conductor of .032 inch diameter, heated by means of a gas burner to a temperature of about 125° C., is passed at a speed of 250 feet per minute through the passage in the guider pin and is positioned as to be within the continuous hollow form of the composition as it leaves the forming section.

As the hollow form is applied to the conductor it adheres thereto and travels therewith. Those occluded or compressed gases within the composition are free to expand as soon as such composition leaves the forming section. Expansion of the compressed gases is readily seen as the insulation gradually grows in thickness from the time it emerges from the forming section until it reaches a point of maximum expansion. In the continuous operation of my method, the growth or expansion of the polyethylene composition is uniform and therefore as the conductor is traveling toward its destination, the insulation will for a period be cone-shaped. The applied insulation has a continuous solid skin of polyethylene.

The diameter of the die employed was .056 inch and therefore the diameter of the insulated conductor as calculated from the above formula is .070 inch.

EXAMPLE 2

The method disclosed in Example 1 was employed to apply blown polyethylene insulation, comprising 98.93% by weight of polyethylene, 1% by weight of Celogen, and .070% by weight of an antioxidant, about a No. 14 A.W.G. copper conductor of 0.064 inch diameter. The antioxidant employed was N,N'-diphenyl para phenylenediamine, which is sold by the United States Rubber Co. As the die diameter was .182 inch, the diameter of the insulated conductor as calculated from the above formula is .250 inch. Application of the insulation to the conductor was accomplished at a wire speed of 70 feet per minute.

The blown polyethylene-insulated conductors were subjected to various procedures for determining the electrical and physical properties of such insulation. To furnish a means for comparison similar procedures were conducted on solid polyethylene-insulated conductors having the identical conductor diameter and insulation thickness as those insulated conductors prepared in Examples 1 and 2. The tables below comprise a tabulated account of the electrical and physical properties of the insulated conductors.

TABLE I

|  | Solid Polyethylene Insulated Conductor | | Blown Polyethylene Insulated Conductor | |
| --- | --- | --- | --- | --- |
| Diameter of Insulated Conductor, inch | .070 | | .070 | |
| Density | .93 | | .47 | |
| Tensile Strength, p.s.i. at 23° C | 2,180 | | 670 | |
| Elongation, Percent at 23° C | 580 | | 310 | |
| Dielectric Strength per .019 inch: | | | | |
| Short Time, v | 23,300 | | 2,840 | |
| Step by Step, v | 23,000 | | 1,670 | |
| Power Factor × $10^5$: | 15.5° C. | 50° C. | 15.5° C. | 50° C. |
| 1,000 cycles | 24 | 25 | 50 | 53 |
| 10,000 cycles | 25 | 25 | 79 | 68 |
| Dielectric Constant: | | | | |
| 1,000 cycles | 2.31 | 2.22 | 1.41 | 1.36 |
| 10,000 cycles | 2.32 | 2.20 | 1.41 | 1.34 |

TABLE II

|  | Solid Polyethylene Insulated Conductor | | Blown Polyethylene Insulated Conductor | |
| --- | --- | --- | --- | --- |
| Diameter of Insulated Conductor | .250 inch | | .250 inch. | |
| Density | .92 | | .47. | |
| Tensile Strength, p.s.i. at 23° C. | 1,470 | | 520. | |
| Elongation, Percent at 23° C. | 510 | | 315. | |
| Dielectric Strength: | | | | |
| Short Time | 57,500 v./.093 inch | | 7,000 v./.090 inch. | |
| Step by Step | 50,800 v./.091 inch | | 6,800 v./.090 inch. | |
| Power Factor × $10^5$: | 15.5° C. | 50° C. | 15.5° C. | 50° C. |
| 1,000 cycles | 24 | 25 | 52 | 58 |
| 10,000 cycles | 25 | 25 | 65 | 68 |
| Dielectric Constant: | | | | |
| 1,000 cycles | 2.31 | 2.22 | 1.44 | 1.42 |
| 10,000 cycles | 2.32 | 2.20 | 1.44 | 1.42 |

The power factor, dielectric strength and dielectric constant values shown in the above tables were obtained according to procedures outlined in A.S.T.M., D–150. Such values, readily disclose that blown polyethylene possesses a much lower dielectric constant than solid polyethylene. Although the values indicate that blown polyethylene possess a slightly higher power factor and a lower dielectric strength than solid polyethylene, the power losses of such insulation are about the same.

To determine the moisture resistance of blown polyethylene, characterized by a cellular structure comprised of single cells and by a solid continuous skin of polyethylene, I submerged two conductors, so insulated, in water having a temperature of 23.3° C. Each conductor was a No. 14 A.W.G. copper wire, one was coated with a medium wall thickness of blown polyethylene and had an outer diameter of 0.150 in., and the other coated with a heavy wall thickness of blown polyethylene and had an outer diameter of 0.250 in. A heavy wall solid polyethylene insulated No. 14 A.W.G. copper wire having an outer diameter of 0.250 in. was also submerged in water and used as a control sample. The power factor and dielectric constant values for each sample at a frequency of 1000 cycles were obtained after various periods of submersion as moisture increases such values and consequently also increases power loss. The tables below comprise a tabulated account of the values obtained.

*Power Factor and Dielectric Constant of Solid and Blown Polyethylene Insulated Electric Conductors*

TABLE III

| Days Submerged | Solid Polyethylene Insulated Conductor .250 in. outer diameter | |
| --- | --- | --- |
| | Power Factor | Dielectric Constant |
| 8 | .00006 | 2.27 |
| 15 | .00017 | 2.27 |
| 29 | .00023 | 2.26 |
| 46 | .0002 | 2.27 |
| 60 | .00026 | 2.28 |
| 74 | .00026 | 2.27 |
| 88 | .00035 | 2.27 |
| | .00033 | 2.27 |

TABLE IV

| Days Submerged | Blown Polyethylene Insulated Conductor .150 in. outer diameter | |
| --- | --- | --- |
| | Power Factor | Dielectric Constant |
| 8 | .00046 | 1.58 |
| 15 | .00081 | 1.58 |
| 29 | .00092 | 1.59 |
| 46 | .0012 | 1.61 |
| 60 | .0014 | 1.63 |
| 74 | .00195 | 1.63 |
| 88 | .0044 | 1.64 |
| | .0047 | 1.65 |

TABLE V

| Days Submerged | Blown Polyethylene Insulated Conductor .250 in. outer diameter | |
| --- | --- | --- |
| | Power Factor | Dielectric Constant |
| 8 | .00059 | 1.44 |
| 15 | .0006 | 1.44 |
| 29 | .0005 | 1.45 |
| 46 | .0004 | 1.45 |
| 60 | .00056 | 1.45 |
| 74 | .0007 | 1.45 |
| 88 | .0011 | 1.45 |
| | .0011 | 1.45 |

The solid polyethylene insulated conductor shows a slight but steady increase in power factor and a constant dielectric constant for the period up to 88 days of continuous submersion. The conductor coated with a medium thickness of blown polyethylene shows a slightly sharper increase in power factor and only a slight increase in dielectric constant. The third conductor coated with a heavy wall of blown polyethylene shows a gradual increase in power factor and no increase in dielectric constant.

From the above values it is seen that only minor moisture penetration of blown polyethylene occurred, as the increase in power factor and in the dielectric constant, if any, were relatively small. It was noted that the percent increase in power factor for the heavy wall blown polyethylene insulated conductor is the same as that of the solid polyethylene insulated conductor.

Blown polyethylene may be employed as an insulating material for ultra-high frequency antenna, and coaxial cables. Particularly desirable will be its use as an insulating material for twin-lead antenna. Another beneficial property of such insulation is that its lightness in weight makes possible its use as an insulating material for telephone cables.

Although the invention has been described in its application toward the preparation of blown polyethylene insulated conductors, it is apparent that such method may be employed for the continuous extrusion of other articles.

Such may be readily accomplished by employing a proper die in conjunction with the extrusion apparatus. Moreover, other means may be employed in the extruder cylinder to restrict the flow of the composition and exert a high back pressure thereon. Such means include the use of a torpedo type screw or the use of small orifice dies.

The addition of fillers, pigments, dies, anti-crack agents, rubbers, antioxidants and other well known modifiers of polyethylene resins may be accomplished without materially affecting the properties of the insulation and without departing from the spirit and scope of the invention.

This application is a continuation in part of my co-pending application Serial No. 361,854, filed June 15, 1953, and now abandoned.

What is claimed is:

1. Method of producing an electrical conductor covered with cellular thermoplastic insulation which comprises forcing a thermoplastic composition containing a substantially completely decomposed blowing agent through a forming section wherein the composition is applied onto and about a heated electrical conductor traveling through said forming section, said electrical conductor having been heated to a temperature of at least about 100° C. prior to the application thereon of said composition, restricting the flow of said composition whereby the pressure developed within said forming section prevents the substantial expansion of gases produced by the decomposition of the blowing agent, passing the conductor from said forming section whereby the composition thereon freely expands, said insulated conductor allowed to slowly cool upon emerging from the forming section.

2. Method as defined in claim 1 wherein the blowing agent is p,p'-oxybis(benzene sulfonyl hydrazide).

3. Method as defined in claim 1 wherein the thermoplastic insulation is polyethylene.

4. Method of producing an electrical conductor covered with cellular thermoplastic insulation which comprises forcing a thermoplastic composition containing a gas-forming blowing agent, at a temperature above the decomposition temperature of the blowing agent, through a forming section wherein the composition is applied onto and about a heated electrical conductor traveling through said forming section, said conductor having been heated to a temperature of at least about 100° C. prior to the application thereon of said composition, restricting the flow of said composition within said forming section whereby the pressure developed prevents the substantial expansion of gases produced by the decomposition of the blowing agent, passing the conductor from said forming section whereby the composition thereon freely expands, said insulated conductor allowed to slowly cool upon emerging from said forming section.

5. Method as defined in claim 4 wherein the said blowing agent is present in said composition in an amount of from about 0.1 to about 10 percent by weight of said composition.

6. A method for continuously extruding a thermoplastic composition about and onto an electrical conductor to produce an electrical conductor covered with cellular insulation which comprises continuously feeding a thermoplastic composition containing a blowing agent to a screw extruder cylinder, working and feeding said composition along said cylinder while heating said cylinder to a temperature sufficient to cause substantially complete decomposition of said blowing agent, restricting the flow of said composition to develop a back pressure in said cylinder, thereby substantially preventing the gas formed by said decomposition of the blowing agent from expanding within the composition in said cylinder, directing said composition, as it passes from said cylinder, through a forming section, said gas within the composition not substantially expanding therein while said composition is passing through said forming section, passing a heated electrical conductor which has been heated to a temperature of at least about 100° C. through said forming section whereby said composition is applied onto and about said conductor within said forming section and permitting said gas to expand within said composition as said composition emerges from the forming section.

7. A method for continuously extruding a thermoplastic composition about and onto an electrical conductor to produce an electrical conductor covered with cellular insulation which comprises continuously feeding a thermoplastic composition containing a blowing agent to a screw extruder cylinder, working and feeding said composition along said cylinder while heating said cylinder to a temperature sufficient to cause substantially complete decomposition of said blowing agent, restricting the flow of said composition to develop a back pressure in said cylinder thereby compressing and substantially preventing the gas formed by said decomposition from expanding within the composition in said cylinder, directing said composition as it passes from said cylinder through a forming section comprising a die and a hollow guider pin, said gas within said composition not substantially expanding therein while said composition is passing through said forming section, passing an electrical conductor which has been heated to a temperature of at least about 100° C. through said hollow guider pin, applying said composition about said electrical conductor within said forming section, said compressed gas within said composition being free to expand within said composition as the insulated conductor emerges from the forming section, and slowly cooling said insulated conductor once it has passed out of the forming section.

8. A method for continuously extruding a thermoplastic composition about and onto an electrical conductor which comprises continuously feeding a composition comprising polyethylene resin and p,p'-oxybis(benzene sulfonyl hydrazide) to a screw extruder cylinder, said p,p'-oxybis(benzene sulfonyl hydrazide) being present in an amount of about 1% by weight of said composition, working and feeding said composition along said cylinder while heating said cylinder to a temperature sufficient to cause substantially complete decomposition of said hydrazide, restricting the flow of said composition to develop a high back pressure in said cylinder thereby compressing and substantially preventing the gas formed by said decomposition from expanding within the composition in said cylinder, directing said composition as it passes from said cylinder through a forming section comprising a die and a hollow guider pin, said gas within said composition not substantially expanding therein while said composition is passing through said forming section, passing an electrical conductor which has been heated to a temperature of at least about 100° C. through said hollow guider pin, extruding said composition about said electrical conductor, said compressed gas within said composition being free to commence to expand within said composition as said composition emerges from the forming section and is slowly cooled, the said compressed gases expanding said polyethylene composition to the extent of the approximate value determined by the equation:

$$D = \sqrt{2Di^2 - d^2}$$

wherein $D$ = outer diameter of the insulated conductor
$Di$ = diameter of the die
$d$ = diameter of the conductor.

9. Method of producing an electrical conductor covered with cellular polyethylene which comprises heating a composition comprising polyethylene and a gas-forming blowing agent to a temperature sufficient to cause substantially complete decomposition of said blowing agent, maintaining sufficient pressure on said composition to substantially prevent the gas formed by the decomposition of the blowing agent from expanding within the composition, applying said composition containing the compressed gas onto and about an electrical conductor, said conductor having been heated to a temperature of at least about 100° C. prior to the application thereon of said composition, allowing said compressed gases to expand whereby the said gases expand said polyethylene composition to produce a uniform thickness of cellular polyethylene about said conductor, and allowing said cellular polyethylene to slowly cool.

10. Method as defined in claim 9 wherein the blowing agent is p,p'-oxybis(benzene sulfonyl hydrazide).

11. Method as defined in claim 10 wherein the composition comprising polyethylene and the p,p'-oxybis(benzene sulfonly hydrazide) is heated to a temperature of at least about 170° C.

12. Method as defined in claim 10 wherein said hydrazide is present in said composition in an amount of about 1 percent by weight of said composition and said composition is heated to a temperature of at least about 170° C.

References Cited in the file of this patent

UNITED STATES PATENTS

| | | |
|---|---|---|
| 2,215,996 | Benton | Sept. 24, 1940 |
| 2,354,260 | Haney et al. | July 25, 1944 |
| 2,496,147 | Brillhart | Jan. 31, 1950 |
| 2,581,769 | Olson | Jan. 8, 1952 |
| 2,766,481 | Henning | Oct. 16, 1956 |

FOREIGN PATENTS

| | | |
|---|---|---|
| 629,668 | Great Britain | Sept. 26, 1949 |